United States Patent
Yang et al.

(10) Patent No.: US 7,310,244 B2
(45) Date of Patent: Dec. 18, 2007

(54) PRIMARY SIDE CONTROLLED SWITCHING REGULATOR

(75) Inventors: Ta-yung Yang, Milpitas, CA (US); Pei-Hsuan Cheng, Taipei (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/338,791

(22) Filed: Jan. 25, 2006

(65) Prior Publication Data

US 2007/0171682 A1    Jul. 26, 2007

(51) Int. Cl.
*H02M 3/335*    (2006.01)
(52) U.S. Cl. .................... 363/20.01; 363/97
(58) Field of Classification Search ............. 363/20, 363/20.01, 21.08, 95, 97, 131
See application file for complete search history.

(56) References Cited

U.S. PATENT DOCUMENTS

| 4,858,052 | A * | 8/1989 | McDonnal | 361/18 |
|---|---|---|---|---|
| 6,917,527 | B2 * | 7/2005 | Takada | 363/16 |
| 7,054,170 | B2 * | 5/2006 | Yang et al. | 363/21.18 |
| 7,123,490 | B2 * | 10/2006 | Amei | 363/21.14 |
| 2005/0162872 | A1 * | 7/2005 | Hirabayashi et al. | 363/19 |
| 2005/0169017 | A1 * | 8/2005 | Muegge et al. | 363/21.15 |

* cited by examiner

*Primary Examiner*—Adolf Berhane
(74) *Attorney, Agent, or Firm*—Rosenberg, Klein & Lee

(57) ABSTRACT

A switching regulator includes a transformer having a primary winding and an auxiliary winding connected to the supply rail of the switching regulator. The primary winding is coupled to the positive supply rail. The auxiliary winding is coupled to the negative supply rail. A switch is connected in series with the primary winding and the auxiliary winding for switching the transformer. A control circuit is coupled to the switch and the auxiliary winding to generate a switching signal for switching the switch and regulating the output of the switching regulator. A supplied capacitor is connected to the control circuit to supply the power to the control circuit. The auxiliary winding having a leakage inductor stores a stored energy when the switch is on. A diode is coupled from the negative supply rail to the supplied capacitor. The stored energy of the leakage inductor is discharged to the supplied capacitor through the diode once the switch is off. The connection of the transformer and the switch improves the efficiency and reduces the EMI.

11 Claims, 3 Drawing Sheets

PRIMARY SIDE CONTROLLED SWITCHING REGULATOR

BACKGROUND OF THE INVENTION

1. Field of the Invention

The present invention relates to a regulator, and more specifically relates to a switching regulator.

2. Description of Related Art

Switching regulators are widely used to provide regulated voltage and current. Considerable ongoing research is focused on making regulators more efficient for saving power. A switching regulator typically includes a control circuit, a switch and a transformer. The control circuit is applied to sense the output voltage and/or the output current of the switching regulator, and generate a control signal to control the switch and regulate the output voltage and/or the output current of the switching regulator.

FIG. 1 shows a circuit diagram of a traditional switching regulator. The traditional switching regulator includes a transformer 10 having a primary winding $N_P$, a secondary winding $N_S$ and an auxiliary winding $N_A$. A terminal of the primary winding $N_P$ is coupled to a positive supply rail $V_{IN}$. A switch 11 is connected from another terminal of the primary winding $N_P$ to a negative supply rail (a ground) through a resistor 12. A control circuit 25 is coupled to the switch 11 to control the switch 11 for switching the transformer 10 and regulating the output voltage and/or the output current of the switching regulator. A terminal of the secondary winding $N_S$ connects a rectifier 13. A filter capacitor 14 is coupled between the rectifier 13 and another terminal of the secondary winding $N_S$. Energy is stored into the transformer 10 when the switch 11 is turned on. The energy stored in the transformer 10 is discharged to the output of the switching regulator through the secondary winding $N_S$ once the switch 11 is off. Meanwhile, a reflected voltage $V_{AUX1}$ is generated at the auxiliary winding $N_A$ of the transformer 10.

$$V_O + V_F = N_{NS} \times \frac{d\Phi}{dt} \quad (1)$$

$$V_{AUX1} = N_{NA} \times \frac{d\Phi}{dt} \quad (2)$$

In accordance with equations (1) and (2), the reflected voltage $V_{AUX1}$ can be expressed as $$V_{AUX1} = \frac{N_{NA}}{N_{NS}} \times (V_O + V_F) \quad (3)$$

where $N_{NA}$ and $N_{NS}$ are respectively the winding turns of the auxiliary winding $N_A$ and the secondary winding $N_S$ of the transformer 10; $V_O$ is the output voltage of the switching regulator; $V_F$ is a forward voltage drop of the rectifier 13; the $\phi$ is magnetic flux, $\phi=B \times A_e$ (B is flux density, Ae is the core cross-section of the transformer 10).

The control circuit 25 comprises a supply terminal VDD and a ground terminal GND for receiving power. A voltage divider includes a resistor 15 and a resistor 16 connected between the auxiliary winding $N_A$ of the transformer 10 and the negative supply rail. A voltage detection terminal VS of the control circuit 25 is connected to a joint of the resistor 15 and the resistor 16. A detecting voltage $V_{DET1}$ generated at the voltage detection terminal VS is given by, $$V_{DET1} = \frac{R_{16}}{R_{15} + R_{16}} \times V_{AUX1} \quad (4)$$

where $R_{15}$ and $R_{16}$ are respectively the resistance of the resistors 15 and 16.

The reflected voltage $V_{AUX1}$ further charges a supplied capacitor 17 via a diode 18 to power the control circuit 25. The resistor 12 serves as a current sense device. The resistor 12 is connected from the switch 11 to the negative supply rail for converting the transformer switching current $I_P$ into a current signal $V_{CS}$. A current sense terminal VI of the control circuit 25 is connected to the resistor 12 for detecting the current signal $V_{CS}$. An output terminal VG of the control circuit 25 generates the switching signal $V_{PWM}$ to switch the transformer 10. This switching regulator is generally used to regulate output voltage and output current, but it includes several disadvantages. One disadvantage is high power consumption caused by the leakage inductor of the transformer 10. A snubber circuit includes a snubber diode 19, a snubber capacitor 20 and a snubber resistor 21 to consume the stored energy of the leakage inductor of the transformer 10 for protecting the switch 11 from a high voltage spike. Another disadvantage of this switching regulator is a poor load regulation at light load and no load. The power of the control circuit 25 is supplied from the auxiliary winding $N_A$ of the transformer 10. Therefore, the operating current of the control circuit 25 represents the load of the auxiliary winding $N_A$. If the load at the output voltage $V_O$ of the switching regulator is lower than the load consumed by the auxiliary winding $N_A$, then the stored energy of the transformer 10 will only be discharged to the supplied capacitor 17 through the diode 18 and the auxiliary winding $N_A$. The rectifier 13 will remain off when the switch 11 is turned off. Therefore, the output voltage $V_O$ of the switching regulator cannot be feedback through the auxiliary winding $N_A$. The detecting voltage $V_{DET1}$ generated at the voltage detection terminal VS will be only related to the voltage of the supply terminal VDD at light load and no load situations.

Another prior art is "Primary-side controlled flyback power converter" by Yang, et al; U.S. Pat. No. 6,853,563. One principal drawback of this prior-art invention is high EMI (electric and magnetic interference). The drain terminal of the switch is directly connected to the positive supply rail $V_{IN}$. A parasitic capacitor of the switch and a parasitic inductor coupled together develop a high frequency resonant tank, which produces higher EMI.

The object of the present invention is to provide a switching regulator having high efficiency and low EMI. Besides, the output voltage of the switching regulator can be accurately regulated at light load and no load.

SUMMARY OF THE INVENTION

A switching regulator includes a transformer having a primary winding and an auxiliary winding. The primary winding is coupled to a positive supply rail. The auxiliary winding is coupled to a negative supply rail. A switch is connected in series with the primary winding and the auxiliary winding for switching the transformer. A current sense device is connected from the switch to the auxiliary winding for generating a current signal in accordance with a switching current of the transformer. A control circuit is coupled to the switch and the auxiliary winding of the transformer to generate a switching signal in response to the current signal. The switching signal is used for switching the switch and regulating the output of the switching regulator. A supplied capacitor is connected to the control circuit to supply the power to the control circuit. The auxiliary winding has a leakage inductor to store a stored energy when the switch is on. A diode is coupled from the negative supply rail to the supplied capacitor. The stored energy of the leakage inductor is discharged to the supplied capacitor through the diode once the switch is off. The connection of the transformer and the switch improves the efficiency and reduces the EMI.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
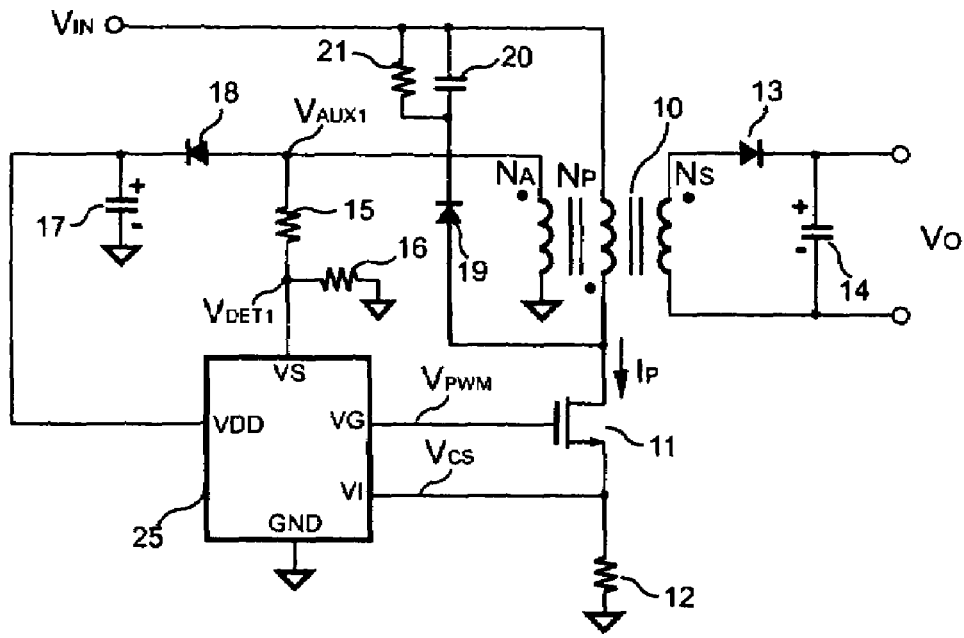
FIG. 1 shows a circuit diagram of a traditional switching regulator.
Figure 2:
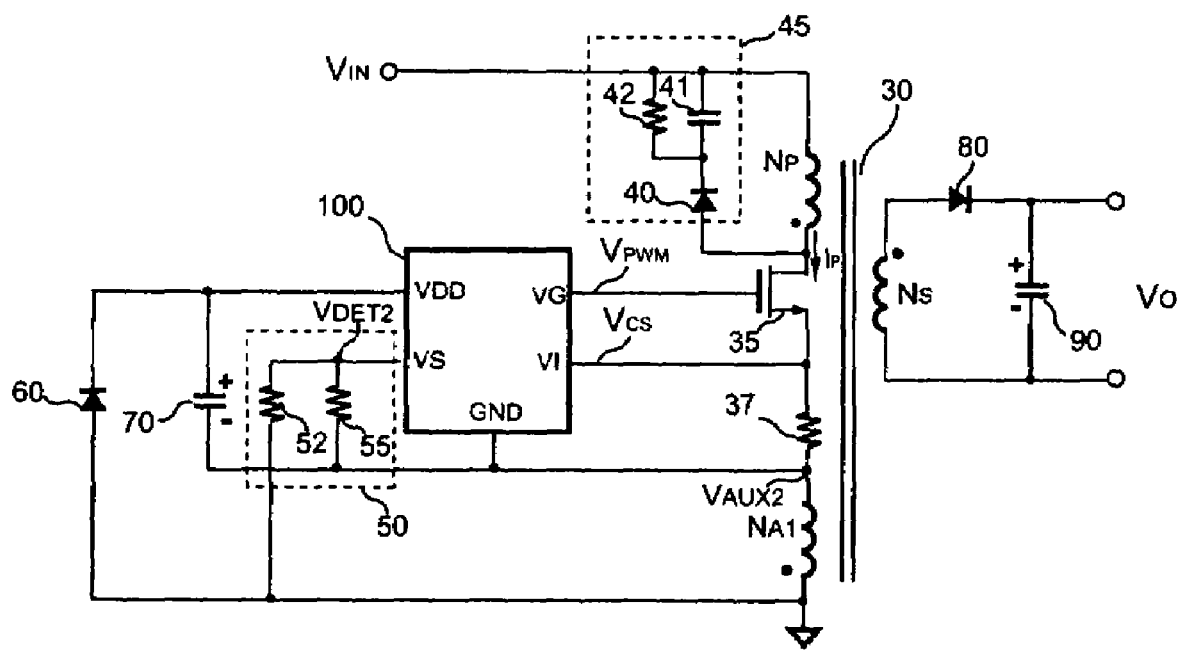
FIG. 2 shows a circuit diagram of a primary-side controlled switching regulator according to one embodiment of the present invention.

FIG. 2 shows a circuit diagram of a primary-side controlled switching regulator in accordance with the present invention. The switching regulator includes a transformer 30 for transferring a stored energy from a primary side of the transformer 30 to a secondary side of the transformer 30. The primary side of the transformer 30 has a primary winding $N_P$ and a first auxiliary winding $N_{A1}$. The secondary side of the transformer 30 has a secondary winding $N_S$. The primary winding $N_P$ and the first auxiliary winding $N_{A1}$ are coupled to the supply rail of the transformer 30. The primary winding $N_P$ is coupled to a positive supply rail $V_{IN}$ of the supply rail of the transformer 30. The first auxiliary winding $N_{A1}$ is coupled to a negative supply rail (ground) of the supply rail of the transformer 30. A switch 35 is connected in series with the primary winding $N_P$ and the first auxiliary winding $N_{A1}$ for switching the transformer 30. The switch 35 can be a power transistor or a power MOSFET. Because the switch 35 is connected in series with the primary winding $N_P$ and the first auxiliary winding $N_{A1}$, the high frequency resonant tank caused by the parasitic devices is eliminated and also the EMI is reduced.

A current sense device such as a current sense resistor 37 is connected from the switch 35 to the first auxiliary winding $N_{A1}$ for generating a current signal $V_{CS}$ in accordance with the switching current $I_P$ of the transformer 30. In order to regulate an output voltage $V_O$ of the switching regulator, a control circuit 100 is coupled to the switch 35 and the first auxiliary winding $N_{A1}$ of the transformer 30 to generate a switching signal $V_{PWM}$. The switching signal $V_{PWM}$ is used for switching the switch 35 and regulating the output voltage $V_O$ of the switching regulator. A supplied capacitor 70 is connected to the control circuit 100 to supply the power to the control circuit 100. A first diode 60 is coupled between the supplied capacitor 70 and the negative supply rail of the transformer 30.

A snubber circuit 45 is coupled between the primary winding $N_P$ and the positive supply rail $V_{IN}$. The snubber circuit 45 includes a snubber diode 40, a snubber capacitor 41 and a snubber resistor 42. A terminal of the snubber diode 40 is coupled to the primary winding $N_P$ and the switch 35. The snubber capacitor 41 is coupled between another terminal of the snubber diode 40 and the positive supply rail $V_{IN}$. The snubber resistor 42 is coupled in parallel with the snubber capacitor 41. A voltage divider 50 is coupled between the first auxiliary winding $N_{A1}$ and the negative supply rail. The voltage divider 50 includes resistors 52 and 55. The resistor 52 is coupled between the control circuit 100 and the negative supply rail. The resistor 55 is coupled between the resistor 52 and the first auxiliary winding $N_{A1}$. A rectifier 80 is coupled to the secondary winding $N_S$. A filter capacitor 90 is coupled between the secondary winding $N_S$ and the rectifier 80.

Figure 3:
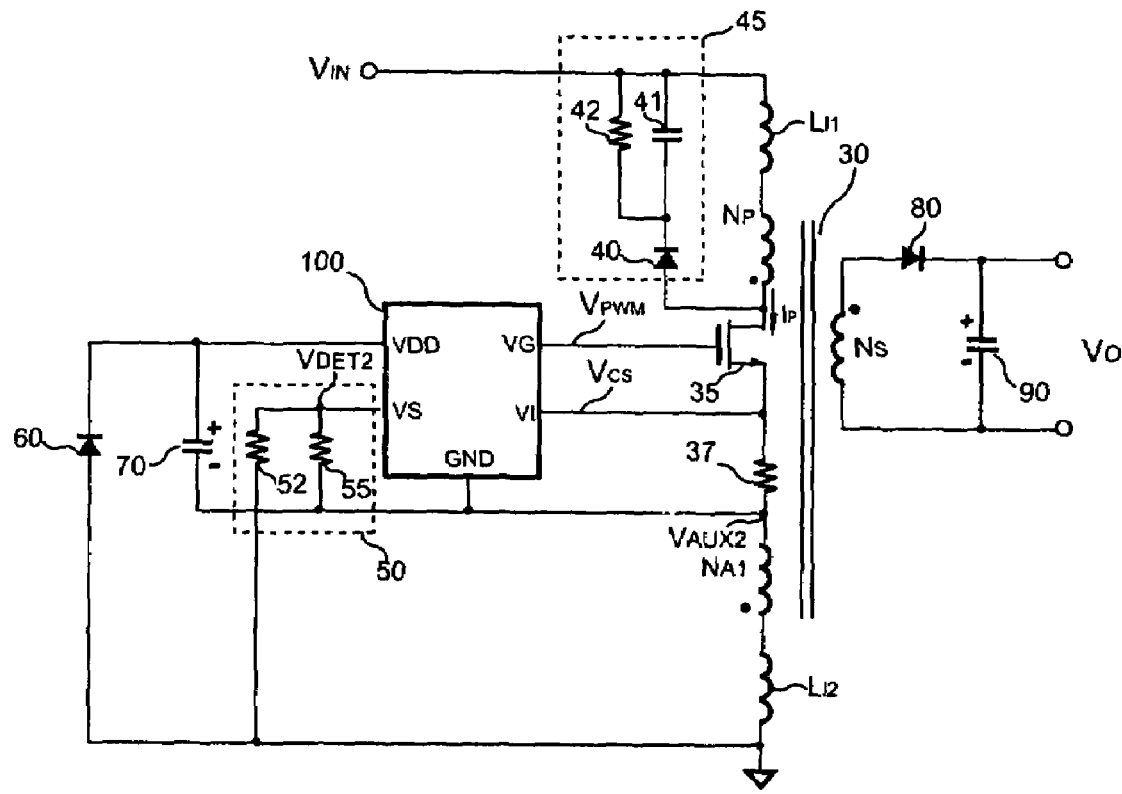
FIG. 3 shows an equivalent circuit diagram of the switching regulator shown in FIG. 2.

FIG. 3 shows an equivalent circuit diagram of the switching regulator shown in FIG. 2. The primary winding $N_P$ and the first auxiliary winding $N_{A1}$ include leakage inductors $L_{11}$ and $L_{12}$ respectively. Due to the geometrical structure of the transformer, the stored energy of the primary side winding of the transformer cannot be fully transferred to other windings of the transformer. The leakage inductors $L_{11}$ and $L_{12}$ stand for stored energy that cannot be transferred. The switching current $I_P$ is flowed into the transformer 30 when the switch 35 is turned on. The energy is thus stored into the transformer 30 and leakage inductors $L_{l1}$ and $L_{l2}$. When the switch 35 is turned off, the stored energy of the transformer 30 is discharged to the secondary winding $N_S$. Meanwhile the stored energy of the leakage inductors $L_{l1}$ and $L_{l2}$ will be circulated within the loop. If the loop is locked, a voltage spike will be produced.

$$V = L \times \frac{di}{dt} \qquad (5)$$

The snubber circuit 45 is used to consume the stored energy of the leakage inductor $L_{l1}$ for protecting the switch 35 from a high voltage spike. The power consumed by the snubber resistor 42 of the snubber circuit 45 can be shown as, $$P_R = \frac{V_{R42}^2}{R_{42}} = \frac{1}{2} \times L_l \times I_P^2 \times f_{SW} \qquad (6)$$

where $R_{42}$ is the resistance of the snubber resistor 42; $V_{R42}$ is the voltage across the snubber resistor 42; $L_l$ is the inductance of the leakage inductor $L_{l1}$; $f_{SW}$ is the switching frequency of the switch 35.

Therefore, reducing the inductance of the leakage inductor of the transformer 30 will increase the efficiency of the switching regulator. However, in order to meet the safety requirement, the winding of the transformer 30 always produces a significant leakage inductance. A simple way to reduce the leakage inductance is to reduce the winding turns.

$$L = \mu \times \frac{0.4\pi \times Ae}{li} \times N^2 \qquad (7)$$

where L is the inductance; μ is core permeability; li is magnetic path length; N is the number of winding turns; Ae is the core cross-section of the transformer 30.

Connecting the primary winding $N_P$ in series with the first auxiliary winding $N_{A1}$ can reduce the winding turns so that the leakage inductance in the primary winding $N_P$ is reduced. The stored energy of the leakage inductor $L_{l2}$ is discharged to the supplied capacitor 70 through the first diode 60 once the switch 35 is off. Therefore, the stored energy of the leakage inductor $L_{l2}$ is supplied to the control circuit 100. The voltage $V_{DD}$ generated in the supplied capacitor 70 can be shown as $$V_{DD} = \left[\frac{N_{NA1}}{N_{NS}} \times (V_O + V_F)\right] + V_{L12} \qquad (8)$$

where $N_{NA1}$ and $N_{NS}$ are respectively the winding turns of the first auxiliary winding $N_{A1}$ and the secondary winding $N_s$ of the transformer 30.

The $V_{L12}$ is the voltage generated by the leakage inductor $L_{l2}$. It is given by, $$\frac{1}{2} \times C_{70} \times V_{L12}^2 = \frac{1}{2} \times L_2 \times I_P^2 \qquad (9)$$

$$V_{L12} = \sqrt{\frac{L_{12}}{C_{70}}} \times I_P \qquad (10)$$

where $C_{70}$ is the capacitance of the supplied capacitor 70; $L_2$ is the inductance of the leakage inductor $L_{l2}$.

Because the voltage $V_{L12}$ generated by the leakage inductor $L_{l2}$ causes the voltage $V_{DD}$ on the supplied capacitor 70 is higher than the voltage reflected from the secondary winding $N_S$ of the transformer 30. The rectifier 80 is thus switched on once the switch 35 is switched off. Therefore, the output voltage $V_O$ of the switching regulator can be fed to the control circuit 100 through the first auxiliary winding $N_{A1}$. By properly developing the leakage inductor $L_{l2}$ of the first auxiliary winding $N_{A1}$ will improve the load regulation at light load and no load circumstances.

Figure 4:
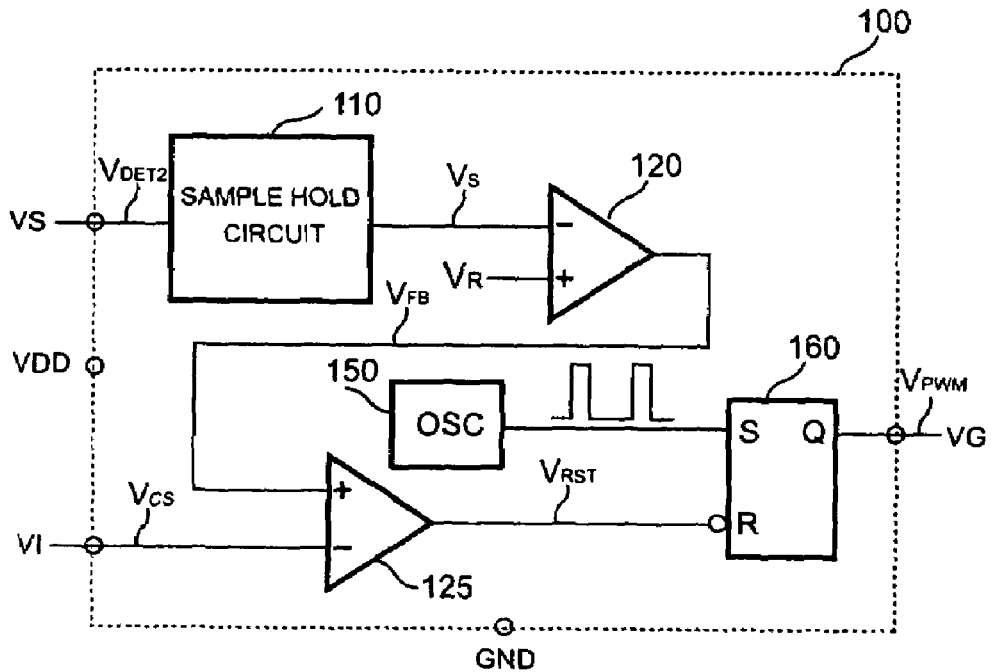
FIG. 4 shows a circuit diagram of a control circuit of the switching regulator according to one embodiment of the present invention.

FIG. 4 shows the circuit diagram of the control circuit 100 that includes a supply terminal VDD and a ground terminal GND parallel connected to the supplied capacitor 70 for receiving power. The supply terminal VDD is connected to the first diode 60. The ground terminal GND is connected to the first auxiliary winding $N_{A1}$. A voltage detection terminal VS is coupled to the first auxiliary winding $N_{A1}$ through the voltage divider 50 for detecting a detecting voltage $V_{DET2}$ from the first auxiliary winding $N_{A1}$ of the transformer 30. The detecting voltage $V_{DET2}$ can be expressed as, $$V_{DET2} = \frac{R_{52}}{R_{52} + R_{55}} \qquad (11)$$

where $R_{52}$ and $R_{55}$ are respectively the resistance of the resistors 52 and 55; $V_{AUX2}$ is the voltage of the first auxiliary winding $N_{A1}$.

A current sense terminal VI is coupled to the switch 35 and the current sense resistor 37 for receiving the current signal $V_{CS}$. An output terminal VG is coupled to an output terminal of a flip-flop 160 to generate the switching signal $V_{PWM}$ for switching the transformer 30 via the switch 35. An oscillator 150 generates a periodic pulse signal transmitted to a set terminal of the flip-flop 160. The periodic pulse signal is utilized to start the switching signal $V_{PWM}$. A comparator 125 is used to turn off the switching signal $V_{PWM}$. A negative input terminal of the comparator 125 is connected to the current sense terminal VI to receive the current signal $V_{CS}$. A positive input terminal of the comparator 125 is connected to an output terminal of an error amplifier 120 to receive a feedback signal $V_{FB}$.

Once the current signal $V_{CS}$ is higher than the feedback signal $V_{FB}$, the switching signal $V_{PWM}$ will be turned off. An output terminal of the comparator 125 is connected to a reset terminal of the flip-flop 160 to generate a reset signal $V_{RST}$ transmitted to the reset terminal to turn off the switching signal $V_{PWM}$. The error amplifier 120 is utilized to generate the feedback signal $V_{FB}$. A positive input terminal of the error amplifier 120 receives a reference voltage $V_R$. A negative input terminal of the error amplifier 120 is connected to an output terminal of a sample-hold circuit 110 to receive a sample signal $V_S$. An input terminal of the sample-hold circuit 110 is coupled to the voltage detection terminal VS to detect the detecting voltage $V_{DET2}$ from the transformer 30 via the voltage divider 50 for generating the sample signal $V_S$. The output voltage $V_O$ of the switching regulator is therefore regulated.

$$V_O + V_F = \frac{N_{NS}}{N_{NA}} \times V_{AUX2} \qquad (12)$$

In accordance with equations (11) and (12), the output voltage $V_O$ can be expressed as $$V_O = \left(\frac{R_{52} + R_{55}}{R_{52}} \times \frac{N_{NS}}{N_{NA}} \times V_{DET2}\right) - V_F \qquad (13)$$

Figure 5:
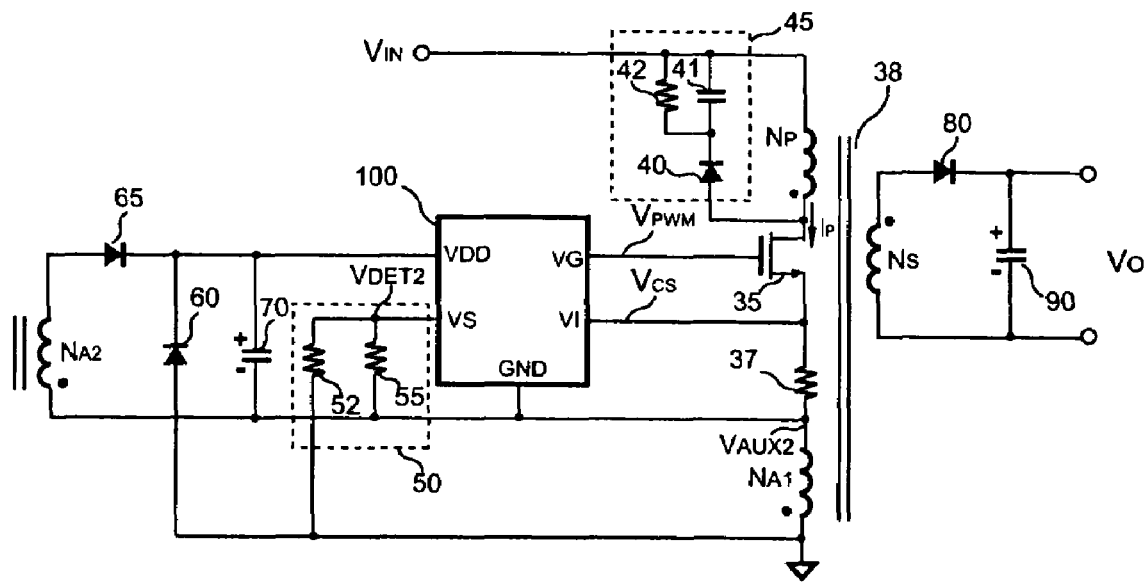
FIG. 5 shows a circuit diagram of another preferred embodiment of the switching regulator according to the present invention.

FIG. 5 shows a circuit diagram of another preferred embodiment of the switching regulator according to the present invention. The transformer 38 includes the primary winding $N_P$, the first auxiliary winding $N_{A1}$ and a second auxiliary winding $N_{A2}$. The second auxiliary winding $N_{A2}$ of the transformer 38 is connected to the first auxiliary winding $N_{A1}$. The second auxiliary winding $N_{A2}$ is further connected to the supplied capacitor 70 through a second diode 65. The ground terminal GND is connected to the auxiliary windings $N_{A1}$ and $N_{A2}$. The supply terminal VDD is connected to the supplied capacitor 70, the first diode 60 and the second diode

65. Because the first auxiliary winding $N_{A1}$ is used for providing the power to the control circuit 100 when the switch 35 is off, the voltage $V_{DD}$ generated on the supplied capacitor 70 is correlated to the output voltage $V_O$ of the switching regulator. The voltage $V_{AUX2}$ of the first auxiliary winding $N_{A1}$ would be too low to supply power to the control circuit 100 if the output voltage $V_O$ of the switching regulator is under the overcurrent and/or short circuit circumstances. The second auxiliary winding $N_{A2}$ is thus developed to charge the supplied capacitor 70 when the switch 35 is switched on. Therefore, the second auxiliary winding $N_{A2}$ provides a second source to supply power to the control circuit 100, which ensures a proper operation of the control circuit 100 during the fault conditions.

Figure 6:
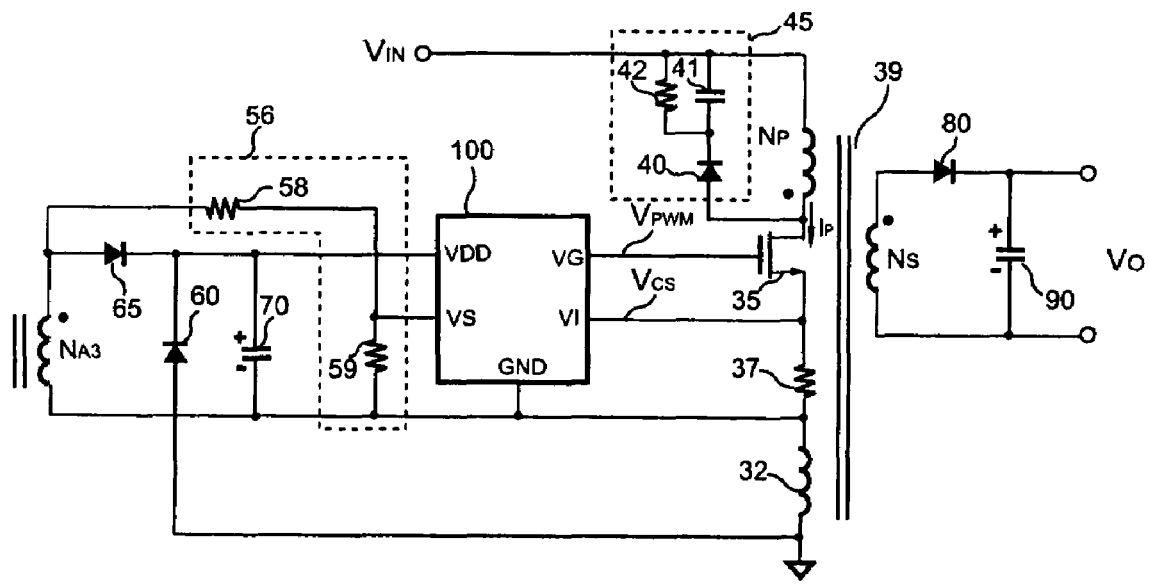
FIG. 6 shows a circuit diagram of another preferred embodiment of the switching regulator according to the present invention.

FIG. 6 shows a circuit diagram of another preferred embodiment of the switching regulator according to the present invention. The transformer 39 includes the primary winding $N_P$, an inductor 32 and a third auxiliary winding $N_{A3}$. The inductor 32 is connected in between the current sense resistor 37 and the negative supply rail. The third auxiliary winding $N_{A3}$ of the transformer 39 is connected to the supplied capacitor 70 through the second diode 65. The third auxiliary winding $N_{A3}$ furthermore is coupled to the inductor 32. A voltage divider 56 having a resistor 58 and a resistor 59 is coupled between the third auxiliary winding $N_{A3}$ and the inductor 32. The resistor 58 is coupled to the third auxiliary winding $N_{A3}$. The resistor 59 is connected in series with the resistor 58 and the inductor 32. The voltage detection terminal VS of the control circuit 100 is coupled to the joint of the resistor 58 and the resistor 59. The ground terminal GND of the control circuit 100 is connected to the third auxiliary windings $N_{A3}$ and the inductor 32. Furthermore, the inductor 32 is used for providing the power to the control circuit 100 through the first diode 60 when the switch 35 is turned off. Therefore, the power source of the control circuit 100 is provided from the third auxiliary winding $N_{A3}$ and the inductor 32, which will improve the load regulation at light load and no load conditions.

According to present invention, the transformer windings minimize the inductance of the leakage inductor. Besides, the stored energy of the leakage inductor of the auxiliary winding or inductor is used to provide power to the control circuit, which achieves better efficiency and improves the load regulation at light load and no load. Furthermore, the connection of the transformer and the switch results a lower EMI.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching regulator, comprising:
   a transformer, transferring the energy from a primary side of the transformer to a secondary side of the transformer, wherein the transformer includes a primary winding and an auxiliary winding, wherein the primary winding and the auxiliary winding are coupled to a positive supply rail and a negative supply rail respectively;
   a switch, connected in series with the primary winding and the auxiliary winding for switching the transformer;
   a control circuit, coupled to the switch and the auxiliary winding to generate a switching signal for switching the switch and regulating the output of the switching regulator;
   a supplied capacitor, connected to the control circuit to supply the power to the control circuit; and
   a diode, coupled from the negative supply rail to the supplied capacitor for charging the supplied capacitor;
   the control circuit further including:
      a voltage detection terminal, coupled to the auxiliary winding for detecting a voltage from the transformer;
      a current sense terminal, coupled to the switch for receiving a current signal;
      an output terminal, generating the switching signal to switch the transformer via the switch;
      a sample-hold circuit, coupled to the voltage detection terminal to detect the voltage from the transformer for generating a sample signal;
      an error amplifier, coupled to the sample-hold circuit, wherein the error amplifier receives a reference voltage and the sample signal for generating a feedback signal;
      a comparator, coupled to the error amplifier and the current sense terminal to receive the feedback signal and the current signal for generating a reset signal;
      an oscillator, generating a periodic pulse signal; and
   a flip-flop, coupled to the oscillator, the comparator and the output terminal for generating the switching signal, wherein the periodic pulse signal and the reset signal are used to start and turn off the switching signal respectively.

2. The switching regulator as claimed in claim 1, further comprising a current sense device connected from the switch to the auxiliary winding for generating the current signal in accordance with a switching current of the transformer, wherein the control circuit receives the current signal for generating the switching signal.

3. The switching regulator as claimed in claim 1, wherein the auxiliary winding has a leakage inductor to store a stored energy when the switch is turned on, wherein the stored energy of the leakage inductor is discharged to the supplied capacitor once the switch is turned off.

4. The switching regulator as claimed in claim 1, wherein the control circuit further comprising:
   a supply terminal, connected to the supplied capacitor and the diode; and
   a ground terminal, connected to the supplied capacitor for receiving the power, wherein the ground terminal is connected to the auxiliary winding.

5. A switching regulator, comprising:
   a transformer, transferring the energy from a primary side of the transformer to a secondary side of the transformer, wherein the transformer includes a primary winding, a first auxiliary winding and a second auxiliary winding, wherein the primary winding and the first auxiliary winding are coupled to a positive supply rail and a negative supply rail respectively, wherein the second auxiliary winding is coupled to the first auxiliary winding;
   a switch, connected in series with the primary winding and the first auxiliary winding for switching the transformer;
   a control circuit, coupled to the switch and the first auxiliary winding to generate a switching signal for switching the switch and regulating the output of the switching regulator;

a supplied capacitor, connected to the control circuit to supply the power to the control circuit;

a first diode, coupled from the negative supply rail to the supplied capacitor for charging the supplied capacitor; and a second diode, coupled from the second auxiliary winding to the supplied capacitor for charging the supplied capacitor;

the control circuit further including:

a voltage detection terminal, coupled to the first auxiliary winding for detecting a voltage from the transformer;

a current sense terminal, coupled to the switch for receiving a current signal;

an output terminal, generating the switching signal to switch the transformer via the switch;

a sample-hold circuit, coupled to the voltage detection terminal to detect the voltage from the transformer for generating a sample signal;

an error amplifier, coupled to the sample-hold circuit, wherein the error amplifier receives a reference voltage and the sample signal for generating a feedback signal;

a comparator, coupled to the error amplifier and the current sense terminal to receive the feedback signal and the current signal for generating a reset signal;

an oscillator, generating a periodic pulse signal; and a flip-flop, coupled to the oscillator, the comparator and the output terminal for generating the switching signal, wherein the periodic pulse signal and the reset signal are used to start and turn off the switching signal respectively.

6. The switching regulator as claimed in claim 5, further comprising a current sense device connected from the switch to the first auxiliary winding for generating the current signal in accordance with a switching current of the transformer, wherein the control circuit receives the current signal for generating the switching signal.

7. The switching regulator as claimed in claim 5, wherein the first auxiliary winding has a leakage inductor to store a stored energy when the switch is turned on, wherein the stored energy of the leakage inductor is discharged to the supplied capacitor once the switch is turned off.

8. The switching regulator as claimed in claim 5, wherein the control circuit further comprising:

a supply terminal, connected to the supplied capacitor, the first diode and the second diode; and a ground terminal, connected to the supplied capacitor for receiving the power, wherein the ground terminal is coupled to the first auxiliary winding and the second auxiliary winding.

9. A switching regulator, comprising:

a transformer, having a primary winding and an auxiliary winding, wherein the primary winding is coupled to a positive supply rail;

an inductor, coupled to a negative supply rail and the auxiliary winding;

a switch, connected in series with the primary winding and the inductor for switching the transformer;

a control circuit, coupled to the switch and the auxiliary winding to generate a switching signal for switching the switch and regulating the output of the switching regulator;

a supplied capacitor, connected to the control circuit to supply power to the control circuit;

a first diode, coupled from the inductor to the supplied capacitor for charging the supplied capacitor; and a second diode, coupled from the transformer to the supplied capacitor for charging the supplied capacitor;

the control circuit further including:

a voltage detection terminal, coupled to the transformer for detecting a voltage from the transformer;

a current sense terminal, coupled to the switch for receiving a current signal;

an output terminal, generating the switching signal to switch the transformer via the switch;

a sample-hold circuit, coupled to the voltage detection terminal to detect the voltage from the transformer for generating a sample signal;

an error amplifier, coupled to the sample-hold circuit, wherein the error amplifier receives a reference voltage and the sample signal for generating a feedback signal;

a comparator, coupled to the error amplifier and the current sense terminal to receive the feedback signal and the current signal for generating a reset signal;

an oscillator, generating a periodic pulse signal; and a flip-flop, coupled to the oscillator, the comparator and the output terminal for generating the switching signal, wherein the periodic pulse signal and the reset signal are used to start and turn off the switching signal respectively.

10. The switching regulator as claimed in claim 9, further comprising a current sense device coupled to the switch for generating the current signal in accordance with a switching current of the transformer, wherein the control circuit receives the current signal for generating the switching signal.

11. The switching regulator as claimed in claim 9, wherein the control circuit further comprising:

a supply terminal, connected to the supplied capacitor, the first diode and the second diode; and a ground terminal, connected to the supplied capacitor, the inductor and the auxiliary winding.

\* \* \* \* \*